US009148301B2

(12) United States Patent
Vankadara

(10) Patent No.: US 9,148,301 B2
(45) Date of Patent: Sep. 29, 2015

(54) DYNAMIC STATUS REPORTING

(75) Inventor: Lavanya Sree Vankadara, Bangalore (IN)

(73) Assignee: Novell, Inc., Provo, UT (US)

( * ) Notice: Subject to any disclaimer, the term of this patent is extended or adjusted under 35 U.S.C. 154(b) by 1351 days.

(21) Appl. No.: 12/604,986

(22) Filed: Oct. 23, 2009

(65) Prior Publication Data

US 2011/0099254 A1    Apr. 28, 2011

(51) Int. Cl.
| | |
|---|---|
| *G06F 15/173* | (2006.01) |
| *H04L 12/58* | (2006.01) |
| *G06Q 10/10* | (2012.01) |

(52) U.S. Cl.
CPC .......... *H04L 12/5815* (2013.01); *G06Q 10/107* (2013.01); *H04L 51/043* (2013.01); *H04L 12/581* (2013.01); *H04L 51/04* (2013.01)

(58) Field of Classification Search
CPC .. G06Q 10/107; G06Q 10/109; H04L 51/043; H04L 12/5815; H04L 12/581; H04L 51/04; Y10S 707/99931; Y10S 707/99943; Y10S 707/99933; Y10S 707/99945
USPC .................................. 709/220, 224; 715/733
See application file for complete search history.

(56) References Cited

U.S. PATENT DOCUMENTS

| | | | | |
|---|---|---|---|---|
| 5,832,483 | A * | 11/1998 | Barker ................................... | 1/1 |
| 6,064,974 | A * | 5/2000 | Broekhuijsen ............... | 705/7.22 |
| 7,099,831 | B2 | 8/2006 | Mitsuoka et al. | |
| 7,221,942 | B2 | 5/2007 | Jung et al. | |
| 2003/0046296 | A1 * | 3/2003 | Doss et al. ..................... | 707/102 |
| 2003/0154275 | A1 * | 8/2003 | Daase et al. ................... | 709/223 |
| 2004/0064567 | A1 * | 4/2004 | Doss et al. ..................... | 709/228 |
| 2005/0044143 | A1 * | 2/2005 | Zimmermann et al. ...... | 709/204 |
| 2005/0055412 | A1 * | 3/2005 | Kaminsky et al. ............ | 709/207 |
| 2005/0080848 | A1 | 4/2005 | Shah | |
| 2006/0009243 | A1 * | 1/2006 | Dahan et al. .................. | 455/466 |
| 2006/0010200 | A1 * | 1/2006 | Mousseau et al. ............ | 709/204 |
| 2006/0080130 | A1 * | 4/2006 | Choksi ............................... | 705/1 |
| 2006/0095976 | A1 | 5/2006 | Torres et al. | |
| 2007/0198696 | A1 * | 8/2007 | Morris .......................... | 709/224 |
| 2007/0198725 | A1 * | 8/2007 | Morris .......................... | 709/227 |
| 2007/0260730 | A1 * | 11/2007 | Gadwale ....................... | 709/224 |
| 2008/0040431 | A1 * | 2/2008 | Bleeker et al. ................ | 709/206 |
| 2008/0141138 | A1 | 6/2008 | Kalaboukis et al. | |
| 2011/0053578 | A1 * | 3/2011 | Rochford ..................... | 455/418 |

FOREIGN PATENT DOCUMENTS

WO    WO-2008082363 A1    7/2008

* cited by examiner

*Primary Examiner* — Ranodhi Serrao
(74) *Attorney, Agent, or Firm* — Schwegman Lundberg & Woessner, P.A.

(57) ABSTRACT

Apparatus, systems, and methods may operate to receive the execution status of a user application, and to transmit the state of a dynamic user status indication, based on the execution status, to a user status reporting application. The state may be changed according to a system administration policy configuration. In some embodiments, activities include changing the state of a dynamic user status indication (included as part of a user status reporting application) based on the execution status of a user application. Changing the status may be conducted according to a user-specified configuration policy or a system administration policy configuration. Further activity may include transmitting the state to at least one additional application to enable display of the state across a network. Additional apparatus, systems, and methods are disclosed.

18 Claims, 4 Drawing Sheets

DYNAMIC STATUS REPORTING

BACKGROUND

Some application programs, such as instant messenger programs and network telephony programs, can display the status of an individual user that reflects the status as it was last set by that user. This static indicator, subject to manual updates by the user, is unaffected by actions of the system administrator.

For example, an employee that sets their instant messenger status to "at work" is perceived by others to in fact be working in their office. Unfortunately, if the employee forgets to change the status to "at home" at the end of the day, then the status indicator will remain set to the state of "at work" for the rest of the evening, on into the next day. Co-workers and others that conduct their work operations according to the static indication of status posted by others, such as their supervisor, may be disappointed in their work efforts, perhaps sending messages to team members that are in no position to receive them. Errors in determining whether others are indeed available to work may lead to lost efficiency, and decreased work environment satisfaction.

SUMMARY

In various embodiments, apparatus, systems, and methods that support dynamic status reporting are provided. For example, some embodiments operate to receive the execution status of a user application, and to transmit the state of a dynamic user status indication (e.g., at work, on break, on vacation), based on the execution status, to a user status reporting application. The state of the dynamic user status indication may be changed according to a user-specified configuration policy or a system administration policy configuration.

In some embodiments, activities include changing the state of a dynamic user status indication (included as part of a user status reporting application) based on the execution status of a user application, according to a user-specified configuration policy or a system administration policy configuration. Further activity may include transmitting the state of the dynamic user status indication to at least one additional application to enable display of the dynamic user status indication across a network. Additional embodiments are described, and along with the foregoing examples, will be set forth in detail below.

DETAILED DESCRIPTION

Figure 1:
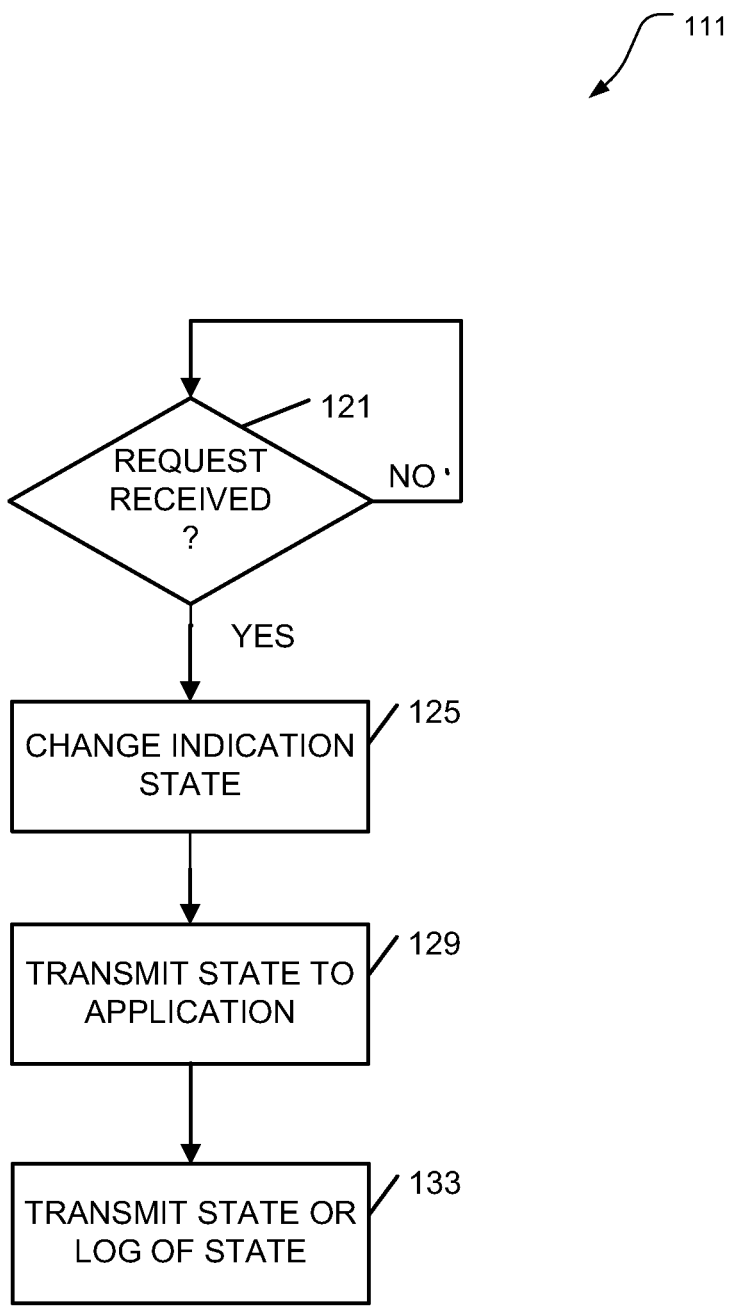
FIG. 1 is a flow diagram illustrating methods of dynamic status reporting according to various embodiments of the invention.

To address some of the challenges described above, some embodiments operate to provide a dynamic user status indication. The state of the dynamic user status indication can change automatically, based on the execution status of a user application, among other possibilities. The change in state may be governed by a user-specified configuration policy, or a system administration policy configuration, such as a configuration that is integrated into and implemented via the Novell® ZENworks® Desktop Management product, using policy-driven automation to handle a variety of tasks, including desktop configuration.

In an example embodiment, users may be permitted to set dynamic data (e.g., local date and time information, the name of the document they currently have open, the Internet address they are browsing, etc.) to appear as part of their dynamic user status indication. When the local date/time is used as part of the dynamic user status indication, for example, co-workers in different time zones can be made aware of the local time of day for a particular user.

In an example embodiment, users can customize messages that are to be displayed, based on the applications running on their desktop. For example, the status of a user could be set to "busy" when the Microsoft® Visual Studio® software development application is executing, and "free" when a media player application is executing. The message associated with one application may be set to override the message from another application when multiple applications are executing at the same time.

The state of the dynamic user status indication that is based on the execution status of a user application may thus vary according to the number of applications executing simultaneously, the application type, the application name, and/or the effect of the application on the user's computation platform, such as the percentage utilization of the processor(s), the amount of memory used, the number of active processes, the type and/or number of ports (e.g., audio, network) in use, etc.

In an example embodiment, a system administrator can also set/enforce a policy to determine how the state of the dynamic user status indication will change, based on the execution status of various user applications. For example, a user's instant messenger application, installed as a desktop agent, can be configured according to a system administrator policy. The policy may operate to set the state of the indication to "idle" when the user's desktop is idle for a specified amount of time, and the policy can be pushed to each workstation that operates under the purview of the system administrator. The administrator's policy can also operate to restrict users from changing system administrator policy settings in some embodiments.

In some embodiments, a user-specified configuration policy or a system administration policy configuration may be used to automatically determine which state of a dynamic user status indication is displayed when a particular application enters a particular execution mode, for example. The system administrator policy configuration may be set to override one or more user-specified configuration policies.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

FIG. 1 is a flow diagram illustrating methods 111 of dynamic status reporting according to various embodiments of the invention. The methods 111 are implemented in a machine-accessible and readable medium and are operational over processes within and among networks. The networks may be wired, wireless, or a combination of wired and wireless. The methods 111 may be implemented as instructions, which when accessed by a specific machine, perform the processing depicted in FIG. 1. Given this context, dynamic status reporting is now discussed with reference to FIG. 1.

The methods 111 can operate to describe dynamic user status reporting as viewed from the perspective of a user-operated node, or an administrative server. Either the user or an administrator can establish the conditions under which executing a selected user application operates to dynamically change the state of the dynamic user status indication. The state of this indication can then be transmitted to other applications, for near real-time, automatic updating.

The state of the indicator is thus not simply indicative that an application is executing. Rather, it conveys a meaning attributed to the fact that an application is executing, or not. This meaning is established by a policy put in place by the user, and/or a system administrator. The policy, or interaction between policies, determines how the execution of a particular application should be interpreted within the context of other circumstances that exist as part of the user's workstation environment. For example, the dynamic user status indication may be adjusted to reflect the type of application that is executing, such as "busy" when the user opens up a spreadsheet, and "free" when the user opens up a chess game application.

In some embodiments, a user status reporting application (e.g., an instant messenger application, a word processing application, or even an application that executes in the background) may be set up to automatically provide dynamic user status reporting, or to refrain from such reporting until an explicit request to add dynamic status update capability is received. This functionality can accommodate users that prefer to set their own status, as opposed to automated updating.

Thus, in some embodiments, a processor-implemented method 111 that can be executed on one or more processors that perform the method may begin at block 121 with waiting to receive, and then receiving a user-initiated request to add the dynamic user status indication to a display of the user status reporting application.

The method 111 may continue on to block 125 with changing the state of the dynamic user status indication in the user status reporting application based on the execution status of a user application. The user application that determines the state based on its execution status may be the same as the user status reporting application, or a different application. The activity of changing the state may be based on a user-specified configuration policy, or a system administration policy configuration, or both, as noted previously.

The method 111 may continue on to block 129 with transmitting the state of the dynamic user status indication to at least one additional application to enable display of the dynamic user status indication across a network. For example, one instant messenger application on a first user's desktop may have a dynamic user status indication that represents the status of the user associated with that desktop. When the state of the indication changes, the change in state may be transmitted to the desktop of another user—perhaps to an instant messenger application that resides on the desktop of the other user.

The user status reporting application may comprise a variety of applications, including a word processor, a calendar, a web meeting application, an instant messaging application, or a system administrator desktop manager, among others. Additional applications that display the dynamic user status indication may be the same as the user status reporting application, or different. In some embodiments, multiple applications are able to display the dynamic user status indication.

Thus, in an example embodiment, a first user may form part of a word processing pool of employees. When the first user opens a word processing application on his desktop, the dynamic user status indication for the first user within the user status reporting application may change from "not at work" to "at work". This change in state may be transmitted to an instant messenger application and/or a word processing application of a second user in the same pool. In this way, a group of employees in a common work area can be dynamically informed as to the work status of the others in their group.

The state of the dynamic user status indication may be indicated by text; still images, including desktop wallpapers, screen savers, and icons; audio; and/or video. In some embodiments, such as when a messenger application is integrated with a mail client, appointments, meetings, vacation rules, and reminder notes, etc. can be pulled from one application and used as the indicator for another application.

In some embodiments, the system administrator can configure different policies for different sets of people. For example, the applications that prompt an indication of "at work" for engineers might be different for employees in marketing. The administrator can also implement role-based policies, such as policies based on whether a person is employed as a student, teacher, or staff.

The dynamic user status indication may include the local user time, such as the user time zone (e.g., the central time zone in the United States), or the actual local clock time of the user. Thus, in some embodiments, the activity at block 129 may comprise transmitting the state of the dynamic user status indication including the local user time.

The dynamic user status indication may be adjusted to reflect an amount of memory used in a user node, or the percentage of processor utilization. The memory usage may be time-averaged to change relatively slowly over time, rather than reflecting large changes over a relatively short time period. Thus, in some embodiments, the activity at block 129 may comprise transmitting the state of the dynamic user status indication based on memory usage in a node executing the user status reporting application.

As noted previously, the state of the dynamic user status indication may be changed to reflect the type of application that is executing, such as "busy" when the user opens up a spreadsheet, and "free" when the user opens up a media player. Thus, in some embodiments, the activity at block 129 may include transmitting the state of the dynamic user status indication based on a type of the user application currently running on the system.

Current and/or prior versions of the state of the dynamic user status indication can be transmitted to an administrator or supervisor spontaneously, according to a schedule, or in response to a request from the administrator. Thus, the method 111 may continue on to block 133 to include transmitting at least one of a current version of the state of the dynamic user status indication, or a log including at least one prior version of the state of the dynamic user status indication, to an administrative node. Other embodiments may be realized.

Figure 2:
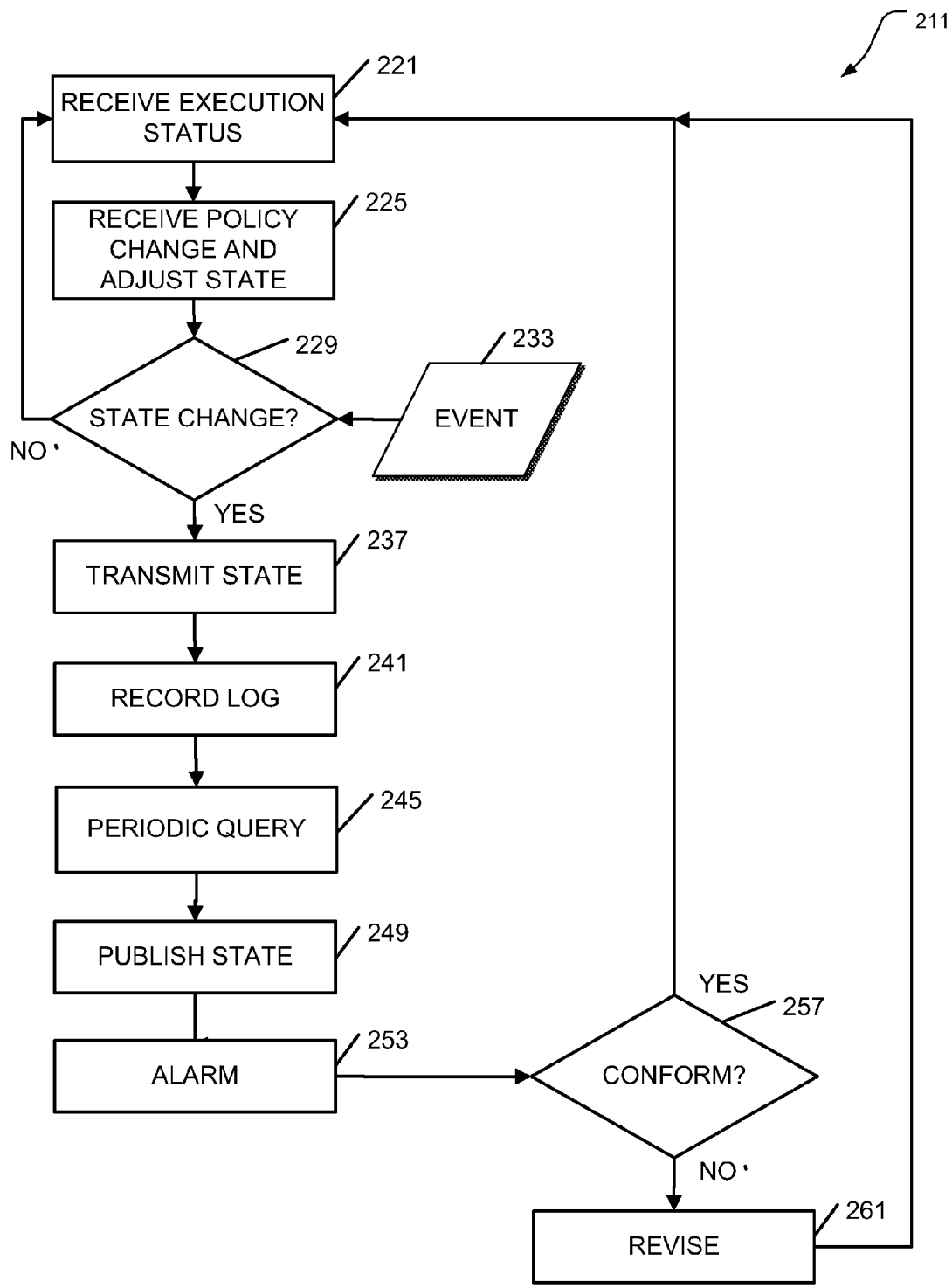
FIG. 2 is a flow diagram illustrating additional methods of dynamic status reporting according to various embodiments of the invention.

For example, FIG. 2 is a flow diagram illustrating additional methods 211 of dynamic status reporting according to various embodiments of the invention. The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2.

In this case, the methods 211 also describe dynamic user status reporting as viewed from the perspective of a user-operated node, or an administrative server, among other possibilities. In some embodiments, the execution status of an application may be monitored, and the resulting dynamic user status indication (based on a user or system administrator policy) is transmitted to a user status reporting application.

Thus, a processor-implemented method 211 that can be executed on one or more processors that perform the method may begin at block 221 with receiving the execution status of a user application. Changes in the execution status may or may not affect the change in the state of the dynamic user status indication, depending on the user or system administrator policy in effect at the time.

In some embodiments, changes in the system administration policy configuration can be immediately reflected as a change in the state of the dynamic user status indication in some embodiments. Thus, the method 211 may continue on to block 225 to include receiving a change to the system administration policy configuration, and adjusting the state of the dynamic user status indication according to the change.

The method 211 may continue on to block 229 with determining whether a change in the state of the dynamic user status indication has occurred. This can take place via changes to the policy, and in many other ways. For example, a change in the dynamic user status indication may be tied to the occurrence of an event. Thus, the activity at block 233, which feeds into the decision block 229, may comprise receiving a revised version of the state of the dynamic user status indication based on an event associated with a node executing the user application. Further activity at block 233 may include, responsive to receiving the revised version, changing the state of the dynamic user status indication to match the revised version.

Events may comprise any number of circumstances. Thus, in addition to user application execution status, the time of day or user movement can be used to change the state of the dynamic user status indication. Therefore, such events may comprise one or more of the occurrence of a unique time, or a user relocating to a different physical location, among others.

If the state has not changed, as determined at block 229, then the method 211 may include returning to block 221. Otherwise, the method 211 may continue on to block 237 with transmitting the state of the dynamic user status indication based on the execution status to a user status reporting application. The change of state may be based on a user-specified configuration policy and/or a system administration policy configuration.

The status associated with one or more users can be recorded and/or monitored remotely by a system administrator, among others. Thus, the method 211 may continue on to block 241 with recording a log of the state of the dynamic status indication over a selected period of time.

The method 211 may continue on to block 245 with operating to periodically obtain the state of the dynamic user status indication, perhaps using a query "pull" mechanism. In an administrative "push" model, the administrator may log in to a console application that automatically receives dynamic status indication updates from a group of nodes that push data out to the network.

A running display, or a log of the dynamic user status indication may thus be displayed to an administrator, supervisor, and others. The method 211 may therefore continue on to block 249 with publishing the state of the dynamic user status indication, along with a time of change associated with the status.

The state of the dynamic user status condition can be monitored, and used to alert the system administrator, among others. Thus, the method 211 may continue on to block 253 with alarming on a selected condition of the state of the dynamic user status indication.

Individuals may set the operational configuration of the dynamic user status indication, and these settings may be monitored and changed to conform to the system administration policy configuration, so that changes in state occur according to the directions of an over-riding administrative policy. Thus, the method 211 may continue on to block 257 to include comparing a user-specified configuration policy with the system administration policy configuration.

If the user-specified configuration policy conforms to the system administrative policy configuration, then the method 211 may continue on to block 221. If the user-specified configuration policy does not conform to the system administrative policy configuration, then the method 211 may continue on to block 261 with revising the user-specified configuration policy to conform to the system administration policy configuration.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The methods shown in FIGS. 1 and 2 can be implemented in various devices, as well as in a computer-readable storage medium, where the methods are adapted to be executed by one or more processors. Further details of such embodiments will now be described.

Figure 3:
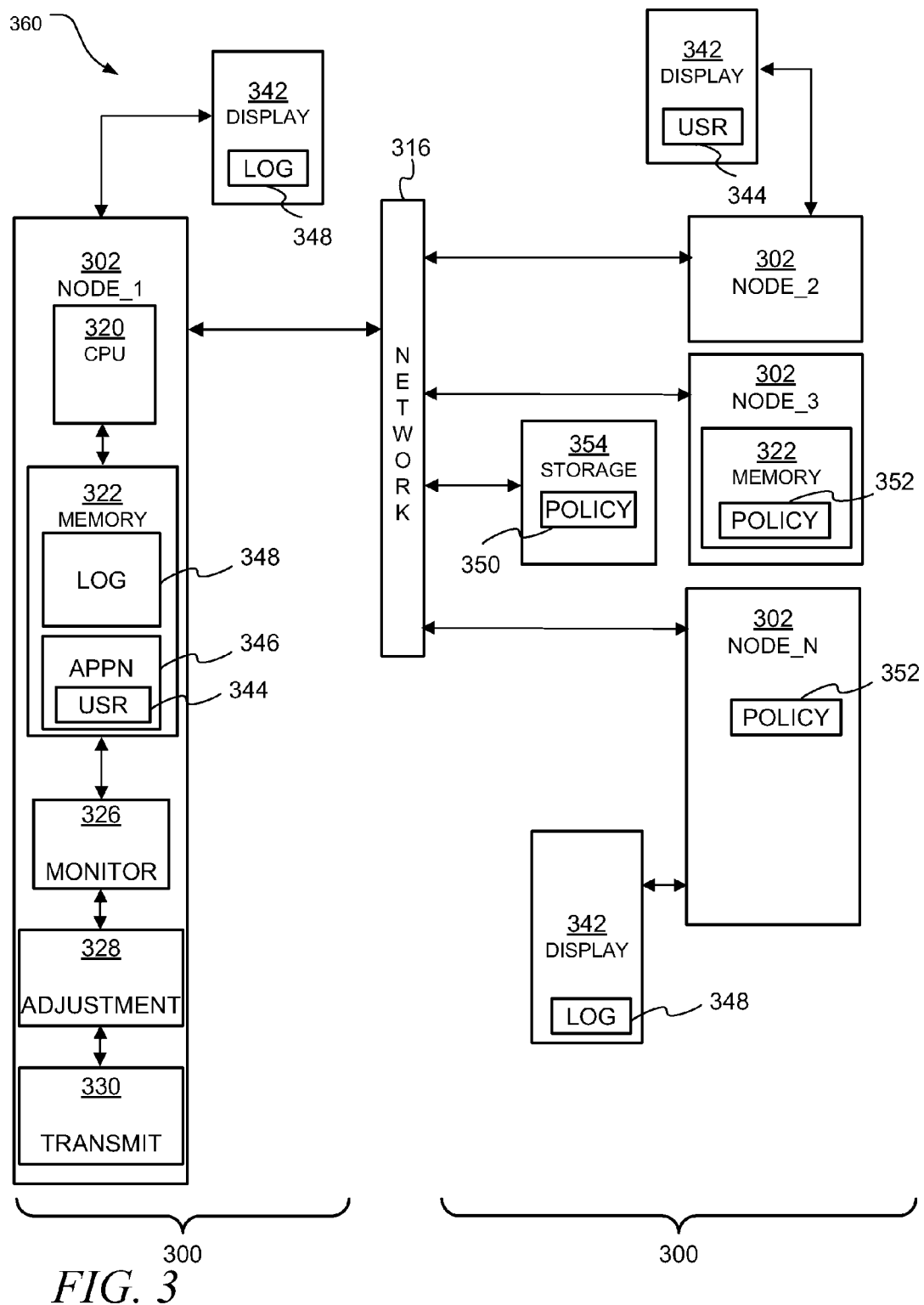
FIG. 3 is a block diagram of apparatus and systems according to various embodiments of the invention.

FIG. 3 is a block diagram of apparatus 300 and systems 360 according to various embodiments of the invention. Here it can be seen that an apparatus 300 used to implement dynamic status reporting may comprise one or more processing nodes 302, one or more processors 320, memories 322, a monitoring module 326, an adjustment module 328, a transmission module 330, and a display 342. The apparatus 300 may comprise a client, a server, or some other networked processing node.

The processing nodes 302 may comprise physical machines or virtual machines, or a mixture of both. The nodes 302 may also comprise networked entities, such servers and/or clients. In some basic implementations, the operations described can occur entirely within a single node 302.

In some embodiments then, an apparatus 300 may comprise one or more nodes 302 that cooperate to change the state of the dynamic user status indication 344 based on a user-specified configuration policy 350 or a system administrative policy configuration 352, and to transmit the indication 344 to other applications. The apparatus 300 may thus take the form of a node 302 (e.g., NODE_1) that includes an adjustment module 328 to change a state of a dynamic user status indication 344 in a user status reporting application 346 based on execution status of a user application, the change based on a user-specified configuration policy 350 or a system administration policy configuration 352. The apparatus 300 may further include a transmission module 330 to transmit the state of the dynamic user status indication 344 to at least one additional application to enable display of the dynamic user status indication 344 across a network 316.

The transmission module 330 can exist in a client or server. In either location, it can send the status indication 344 to another location. For example, the transmission module 330 might exist in a client, as part of an instant messenger application, and operate to transmit the status indication 344 directly to another instant messenger application in another client. The same transmission module 330 might also operate to transmit the status indication 344 to a server, that in turn passes the status indication 344 on to other instant messenger applications within the network 316.

In another example, the transmission module 330 might operate in a server, to receive a status indication 344 from one client, and then pass the state of the status indication 344 it receives on to other clients in the network 316. Thus, for example, desktop management software can be used to adjust a policy that governs when a status change occurs, and specifies to which entities each status indication 344 should be sent. The desktop policy management software may communicate directly with the transmission module 330 to regulate the activity of the transmission module 330. In some cases, the desktop policy management software (e.g., the Novell® ZENworks® Desktop Management product) may itself include the transmission module 330, which then operates to receive status indications 344, to filter them according to one or more policies, and to send them on to other entities if such is in accordance with the sum of the policies that are active for that particular status indication.

The execution status of an application may be monitored within the node (e.g., a client node) that is executing the application, or by a remote node, such as a server. Thus, in some embodiments, the apparatus 300 comprises a monitoring module 326 to monitor the execution status of a particular application.

A display, either local or remote, may be used to display a history of the dynamic user status indication 344. Thus, in some embodiments, the apparatus 300 comprise a display 342 to display a log 348 of the state of the dynamic user status indication 344 over time. Still further embodiments may be realized.

For example, it can be seen that a system 360 that operates to implement dynamic status reporting may comprise multiple instances of the apparatus 300. The system 360 might also comprise a cluster of nodes 302, including physical and virtual nodes. It should be noted that any of the nodes 302 may include any one or more of the elements explicitly shown in nodes NODE_1, NODE_N.

In some embodiments then, a system 360 may comprise multiple nodes: one node (e.g., NODE_1) to operate as a client, and another node (e.g., NODE_N) to operate as a server. The client might operate to monitor/adjust/transmit the dynamic user status indication 344, and the server might operate to access the administrative policy 352.

Thus, in some embodiments, a system 360 comprises a first node (e.g., NODE_1) to house an adjustment module 328. The first node may also house a transmission module 330. The system 360 may further include a second node (e.g., NODE_N) to access the system administration policy configuration 352.

The system 360 may use separate nodes to store the user-specified configuration policy 350 and the system administration policy configuration 352. Thus, the system 360 may comprise a third node (e.g., NODE_3) to house a memory element 322 to store the system administration policy configuration 352, or a separate storage node 354 to store the user-specified configuration policy 350.

The dynamic user status indication 344 can be monitored remotely by other users of the system 360, so that a group of employees using a database application can easily keep track of the status of other users in their same group that are using the same database file in the same database application, for example. Thus, in some embodiments, the system 360 may comprise a third node (e.g., NODE_2) coupled to a display 342 to display the dynamic user status indication 344 as a part of the at least one additional application comprising a spreadsheet, a word processor, an instant messenger, or some other application.

The nodes 302 may exist as a device embedded within another structure (e.g., as an embedded device), or as a regular desktop or laptop computer that includes a display 342 to show the activities conducted while the node 302 is active. Thus, the system 360 may also comprise a display 342 coupled to the nodes 302 to display visible indications of the activities conducted at the nodes 302.

The apparatus 300 and system 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the methods 111 and 211 of FIGS. 1 and 2, respectively. Modules may comprise hardware, software, and firmware, or any combination of these. Additional embodiments may be realized.

Figure 4:
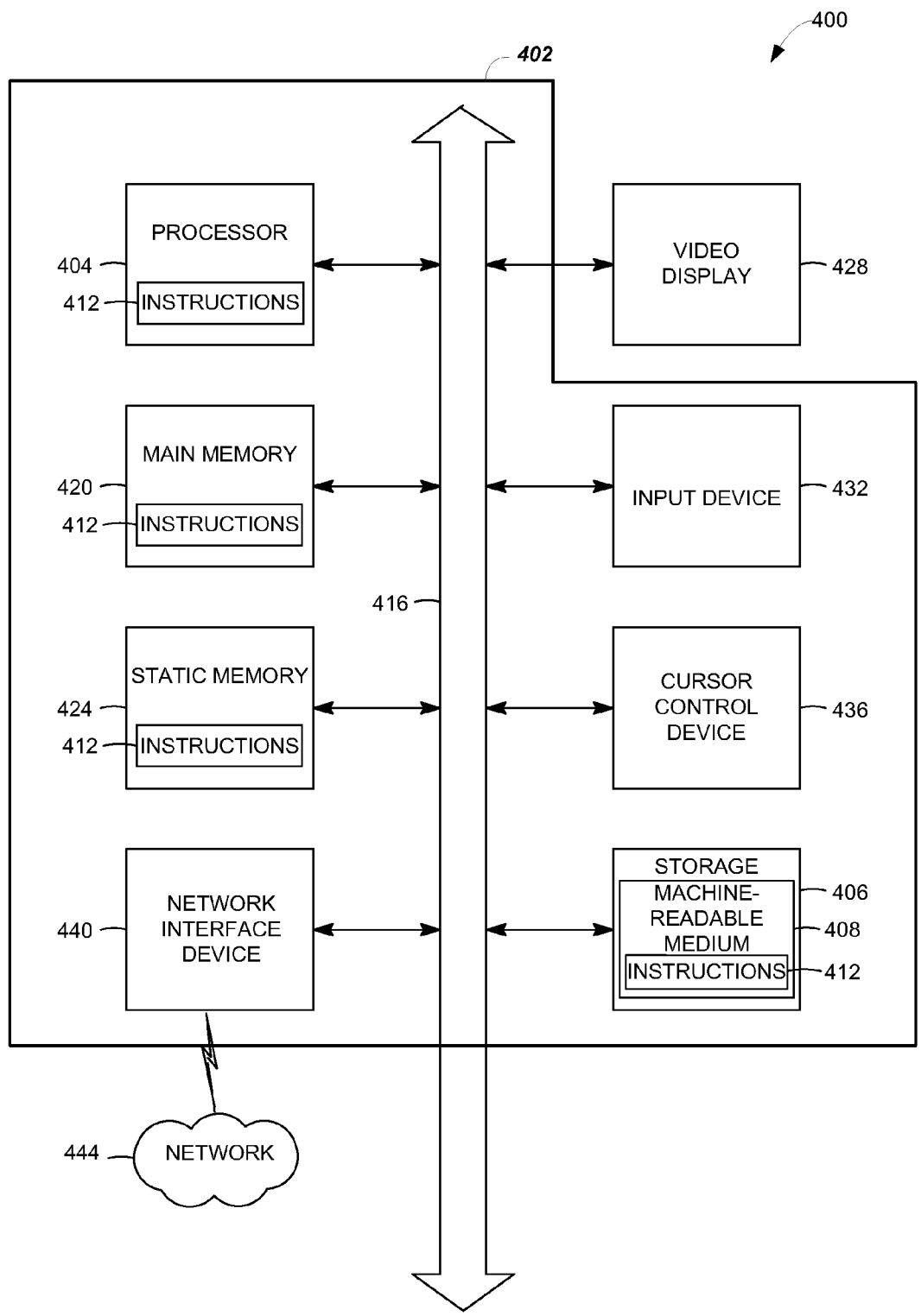
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-oriented format using an object-oriented language such as Java or C++. Alternatively, the programs can be structured in a procedure-oriented format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate so that individual users are able to set up policies that dynamically update user status indications based on the execution status of an application. Custom status messages may be specified for various named applications and application types and/or user roles, as well as interactions between these elements. System administrators may be able to enforce policies that render consistent dynamic user status indication states over a large number of individual user preferences, perhaps overriding individual policies. More efficient allocation of processing resources, and increased user satisfaction, may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
an adjustment module to change a state of a dynamic user status indication in a user status reporting application based on activity of a user computation platform, the activity including execution status of a user application executing on the user computation platform, the change based on a user-specified configuration policy or a system administration policy configuration, the execution status derived from an externally observable characteristic of the user application, the externally observable characteristics including percent utilization of a processor and a type of hardware port used; and
a hardware transmission module to:
periodically obtain the state of the dynamic user status indication;
publish the state of the dynamic user status indication, along with a time of change associated with the status; and
transmit the state of the dynamic user status indication to at least one additional application to enable display of the dynamic user status indication across a network.

2. The apparatus of claim 1, further comprising:
a monitoring module to monitor the execution status.

3. The apparatus of claim 1, further comprising:
a display to display a log of the state of the dynamic user status indication over time.

4. A system, comprising:
a first hardware node to house:
an adjustment module to change a state of a dynamic user status indication in a user status reporting application based on activity of a user computation platform, the activity including execution status of a user application executing on the user computation platform, the change based on a user-specified configuration policy or a system administration policy configuration, the execution status derived from an externally observable characteristic of the user application, the externally observable characteristics including percent utilization of a processor and a type of hardware port used; and
a transmission module to:
periodically obtain the state of the dynamic user status indication;

publish the state of the dynamic user status indication, along with a time of change associated with the status; and transmit the state of the dynamic user status indication to at least one additional application to enable display of the dynamic user status indication across a network; and a second node to access the system administration policy configuration.

5. The system of claim 4, further comprising:

a third node to house a memory element to store the system administration policy configuration.

6. The system of claim 4, further comprising:

a third node coupled to a display to display the dynamic user status indication as a part of the at least one additional application comprising a word processor.

7. A processor-implemented method to execute on one or more processors that perform the method, comprising:

changing a state of a dynamic user status indication in a user status reporting application based on activity of a user computation platform, the activity including execution status of a user application executing on the user computation platform, the changing based on a user-specified configuration policy or a system administration policy configuration, the execution status derived from externally observable characteristics of the user application, the externally observable characteristics including percent utilization of a processor and a type of hardware port used;

periodically obtaining the state of the dynamic user status indication;

publishing the state of the dynamic user status indication, along with a time of change associated with the status; and transmitting the state of the dynamic user status indication to at least one additional application to enable display of the state of the dynamic user status indication across a network.

8. The method of claim 7, wherein the transmitting further comprises:

transmitting the state of the dynamic user status indication including a local user time.

9. The method of claim 7, wherein the activity includes memory usage in a node executing the user status reporting application.

10. The method of claim 7, further comprising:

receiving a user-initiated request to add the dynamic user status indication to a display of the user status reporting application.

11. The method of claim 7, further comprising:

transmitting at least one of a current version of the state of the dynamic user status indication or a log including at least one prior version of the state of the dynamic user status indication, to the administrative node.

12. A processor-implemented method to execute on one or more processors that perform the method, comprising:

receiving activity information of a user computation platform, the activity information including execution status of a user application executing on the user computation platform, the execution status derived from externally observable characteristics of the user application, the externally observable characteristics including percent utilization of a processor and a type of hardware port used;

periodically obtaining the state of the dynamic user status indication; and publishing the state of the dynamic user status indication, along with a time of change associated with the status; and transmitting a state of a dynamic user status indication based on the execution status to a user status reporting application, a change of the state of the dynamic user status indication based on a system administration policy configuration.

13. The method of claim 12, further comprising:

recording a log of the state of the dynamic status indication over a selected period of time.

14. The method of claim 12, further comprising:

receiving a revised version of the state of the dynamic user status indication based on an event associated with a node executing the user application; and responsive to receiving the revised version, changing the state of the dynamic user status indication to match the revised version.

15. The method of claim 14, wherein the event comprises at least one of a unique time or a user relocating to a different physical location.

16. The method of claim 12, further comprising:

receiving a change to the system administration policy configuration; and adjusting the state of the dynamic user status indication according to the change.

17. The method of claim 12, further comprising:

alarming on a selected condition of the state of the dynamic user status indication.

18. The method of claim 12, further comprising:

comparing a user-specified configuration policy with the system administration policy configuration; and revising the user-specified configuration policy to conform to the system administration policy configuration.

* * * * *